(12) United States Patent
Haecker et al.

(10) Patent No.: US 8,978,836 B2
(45) Date of Patent: Mar. 17, 2015

(54) FRICTIONAL TRANSMISSION, IN PARTICULAR FOR A HYDRAULIC UNIT IN A VEHICLE BRAKE SYSTEM

(71) Applicant: Robert Bosch GmbH, Stuttgart (DE)

(72) Inventors: Juergen Haecker, Schwieberdingen (DE); Klaus-Peter Schmoll, Lehrensteinsfeld (DE); Daniel Gosse, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/926,326

(22) Filed: Jun. 25, 2013

(65) Prior Publication Data

US 2014/0004993 A1  Jan. 2, 2014

(30) Foreign Application Priority Data

Jun. 29, 2012  (DE) .......................... 10 2012 211 352

(51) Int. Cl.
| | |
|---|---|
| *F16D 55/08* | (2006.01) |
| *F16H 13/08* | (2006.01) |
| *F16C 33/49* | (2006.01) |
| *F16D 7/00* | (2006.01) |
| *F16C 19/12* | (2006.01) |
| *F16C 19/56* | (2006.01) |

(52) U.S. Cl.
CPC .............. *F16H 13/08* (2013.01); *F16C 33/498* (2013.01); *F16D 7/005* (2013.01); *F16C 19/12* (2013.01); *F16C 19/56* (2013.01)
USPC ......................................................... 188/72.7

(58) Field of Classification Search
USPC ........ 188/72.7–72.9, 171; 476/1, 38; 475/186
See application file for complete search history.

(56) References Cited

U.S. PATENT DOCUMENTS

| | | | | |
|---|---|---|---|---|
| 1,859,502 A | * | 5/1932 | Erban ........................... | 475/186 |
| 2,675,713 A | * | 4/1954 | Acker ................................ | 476/1 |
| 3,424,018 A | * | 1/1969 | Alsch .............................. | 476/38 |
| 3,991,859 A | * | 11/1976 | Coulter et al. ............... | 188/71.9 |
| 2009/0211855 A1 | * | 8/2009 | Dennis et al. ................ | 188/72.7 |

* cited by examiner

*Primary Examiner* — Christopher Schwartz
(74) *Attorney, Agent, or Firm* — Maginot, Moore & Beck LLP

(57) ABSTRACT

In a frictional transmission having at least one rolling contact element, which is guided in frictional engagement between two running surfaces and is furthermore guided by a cage, one of the running surfaces is arranged in a fixed location and the second running surface and the cage are embodied so as to rotate in such a way that an input torque can be introduced via one of the elements, namely the cage or the second running surface, and an output torque can be output via the other element, namely the second running surface or the cage.

19 Claims, 1 Drawing Sheet

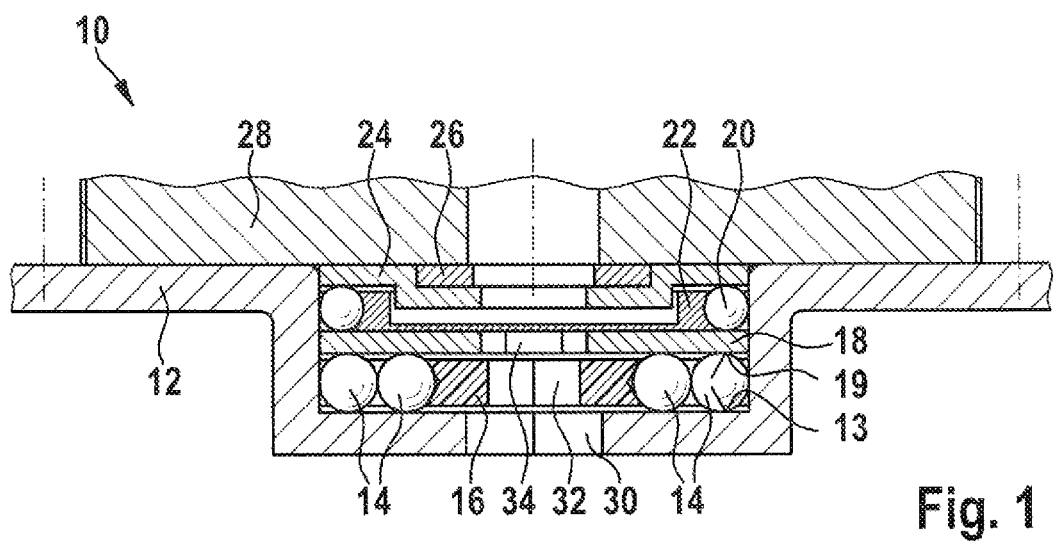
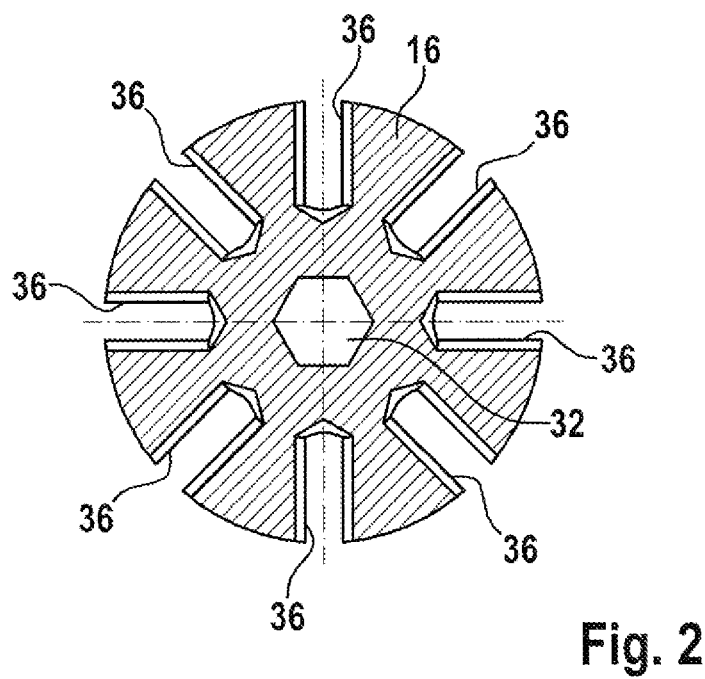

FRICTIONAL TRANSMISSION, IN PARTICULAR FOR A HYDRAULIC UNIT IN A VEHICLE BRAKE SYSTEM

This application claims priority under 35 U.S.C. §119 to patent application no. DE 10 2012 211 352.5, filed on Jun. 29, 2012 in Germany, the disclosure of which is incorporated herein by reference in its entirety.

The disclosure relates to a frictional transmission having at least one rolling contact element guided in frictional engagement between two running surfaces.

BACKGROUND

Frictional transmissions in various embodiments are fundamentally known. They are defined by the fact that a rolling contact element rolls in frictional engagement on at least one running surface. The frictional engagement entails power transmission from the running surface to the rolling contact element with a simultaneous change in the speed of revolution, and this can be used to produce a speed reduction mechanism or a speed increase mechanism as a transmission.

Fundamentally, frictional transmissions of this kind lead to an increased outlay on parts and hence to increased production costs. Moreover, frictional transmissions, like all other functional groups in machines, require a separate installation space.

It is the underlying object of the disclosure to provide a frictional transmission for which both the production costs and the installation space requirement can be kept down.

SUMMARY

According to the disclosure, a frictional transmission is provided, having at least one rolling contact element, which is guided in frictional engagement between two running surfaces and is furthermore guided by a cage, wherein one of the running surfaces is arranged in a fixed location and the second running surface and the cage are embodied so as to rotate in such a way that an input torque can be introduced via one of the elements, namely the cage or the second running surface, and an output torque can be output via the other element, namely the second running surface or the cage.

The frictional transmission according to the disclosure provides a transmission arrangement by means of which, in addition to the transmission function, it is simultaneously possible to transmit high axial forces. The frictional transmission according to the disclosure can thus serve simultaneously as an axial bearing, and this can have a very positive effect both on production costs and on the required installation space. A compact transmission that can be produced from simple parts and, in particular, has a fixed transmission ratio is thus created. In this arrangement, the cage and one of the two running surfaces of the frictional transmission rotate, as a result of which the higher torque and the lower rotational speed are available at the cage. At the same time, the lower torque but the higher rotational speed are available at the second running surface. The speed increase or speed reduction of the frictional transmission according to the disclosure of this kind is about 1 to 2 or 2 to 1. The second running surface thus rotates at about twice the speed of revolution of the cage and the at least one rolling contact element guided therein.

As an advantageous option, the transmission according to the disclosure can be configured with a plurality of stages or n stages arranged in series and can thus provide a $2^n$-times speed increase or speed reduction, slip-related deviations being left out of account.

The use of the disclosed transmission is particularly advantageous in applications in which the torque to be transmitted or converted by the transmission is associated with an axial force proportional thereto. In this case, the axial force can simultaneously act as a preloading force. It is thereby possible to improve the proportional losses, especially when transmitting or converting low torques. Where the preloading force introduced is constant, the frictional torque required for the transmission of the maximum torque is relevant.

As a preferred option, use is made of three rolling contact elements positioned in a manner distributed at equal angular intervals of about 120° around the circumference of the running surface. In this way, an arrangement which can always be statically predetermined is created. The at least one rolling contact element preferably protrudes axially beyond the cage on both sides. It is advantageous if the running surfaces are aligned substantially radially.

Moreover, a preloading device for applying an axial force to the arrangement of the two running surfaces and of the at least one rolling contact element guided in frictional engagement therebetween is preferably provided. The preloading device ensures the frictional connection between the running surfaces and the rolling contact elements which is desired for torque transmission. Through appropriate configuration, the preloading device furthermore ensures that only a maximum permissible torque can be transmitted. For this purpose, the preloading force is limited, thus providing overload protection. The preloading element is preferably an elastically deformable return element in the form of a diaphragm spring or a helical spring which presses axially against the arrangement comprising the running surfaces and the rolling contact elements.

The sliding friction between the at least one rolling contact element and the running surfaces is preferably designed to be greater than the sliding friction between the at least one rolling contact element and the cage. As a result, only small frictional losses are incurred at the cage. For this purpose, it is advantageous if the cage is produced from plastic while the running surfaces and/or the rolling contact elements are produced from steel with a view to high wear resistance.

A plurality of rolling contact elements is furthermore preferably arranged adjacent to one another in the radial direction. The rolling contact elements thus run on raceways of different diameters. Hence, particularly high axial forces and torques can be transmitted. At the same time, the forces between the rolling contact elements and the running surfaces and the cage can be kept relatively low.

As a particularly preferred option, the at least one rolling contact element is designed as a ball. A design of this kind with spherical rolling contact elements has the effect that slip-related frictional losses which occur between cylindrical rolling contact elements and the raceways thereof by virtue of the principle involved can be eliminated or reduced to a minimum. The remaining losses are essentially due to the sliding friction between the rolling contact elements and the cage. As mentioned above, they are reduced through an advantageous configuration of this tribological contact (combination of materials and characteristics of the surface). As an alternative, it is also possible for the rolling contact elements to be designed as cylindrical rollers, preferably being designed as split rows of rollers.

In the frictional transmission according to the disclosure, an input and an output are preferably provided in the center of the cage and of the second running surface. This configuration is advantageous both in respect of driving by means of an electric drive motor with a central drive shaft and in respect of configuration of the first running surface as part of a housing. As an alternative, the input and/or the output can be formed on the outside diameter of the cage and of the second running surface.

In addition, an axial bearing is furthermore preferably provided in the frictional transmission according to the disclosure. By means of the axial bearing, it is possible for axial forces, in particular, to be transmitted to the second running surface. These then increase the transmissible torque in corresponding fashion.

In addition or as an alternative, an additional radial bearing can be provided, making it possible to provide radial support for the rotating second running surface, the cage or one of the input or output elements. The radial bearing is preferably arranged at the inside and/or outside diameter of the cage or of the second running surface, as appropriate.

The first and second running surfaces are preferably both designed with axially recessed raceways. This makes it possible also to transmit radial forces with the transmission arrangement according to the disclosure, at least to a certain extent or to a certain degree.

It is particularly advantageous, according to the disclosure, for the frictional transmission of this kind to be used on a hydraulic unit in a vehicle brake system. There, the frictional transmission can be installed in a hydraulic block and used to drive one of the pump elements with substantially neutral effect on the installation space.

BRIEF DESCRIPTION OF THE DRAWINGS

An illustrative embodiment of the solution according to the disclosure is explained in greater detail below with reference to the attached schematic drawings, in which:

FIG. 1 shows a longitudinal section through an illustrative embodiment of a frictional transmission according to the disclosure, and FIG. 2 shows the section II-II of the cage of the frictional transmission in FIG. 1.

DETAILED DESCRIPTION

The figures illustrate a frictional transmission 10 which comprises a cup-shaped housing disk 12. A total of 16 spherical rolling contact elements 14 surrounded by a disk-shaped cage 16 is arranged in the housing disk 12, on the inner flat bottom surface thereof, which forms a first running surface 13. In this arrangement, the diameters of the rolling contact elements 14 are designed to be greater than the thickness of the cage 16. Within the cup-shaped housing disk 12, a driving disk 18 rests on the rolling contact elements 14 by means of an associated flat second running surface 19. The rolling contact elements 14 are thus enclosed by the two running surfaces 13 and 19 and, at the same time, guided by the cage 16, being able to revolve on the running surfaces 13 and 19 but being kept apart by the cage 16. The cage 16 is produced from plastic, while the rolling contact elements 14, the housing disk 12 and the driving disk 18 are made of steel.

The housing disk 12 is of fixed design, while the driving disk 18 can be set in rotation by a drive (not illustrated specifically). With the rotation of the driving disk 18, the rolling contact elements 14 and, with them, the cage 16 are also set in rotation. In this case, the cage 16 rotates about the axis of rotation at half the speed of rotation of the driving disk 18. A transmission stage with a reduction ratio of 2 to 1 is thus formed. At the same time, the arrangement comprising the driving disk 18, the rolling contact elements 14 and the housing disk 12 forms an axial bearing.

The driving disk 18 is pressed axially against the rolling contact elements 14 and the housing disk 12 by means of bearing balls 20, which form an additional axial a bearing. The bearing balls 20 are surrounded by a bearing cage 22 and enclosed by a bearing disk 24. A preloading device 26 in the form of an elastically deformable and preloaded disk supported against a housing part 28 presses against the bearing disk 24.

A central opening 30, through which a drive shaft (not illustrated) can be passed through to the outside from the driving disk 18 and/or the cage 16 is formed in the housing disk 12. Similarly, a central opening 32 designed as a hexagon is formed in the cage 16, and a central opening 34 is formed in the driving disk 18.

The rolling contact elements 14 are arranged in the cage 16 in a total of eight radial slots 36 spaced apart uniformly by in each case 120° around the circumference, with in each case two rolling contact elements 14 revolving on radially adjacent raceways on the running surfaces 13 and 19 respectively.

What is claimed is:

1. A frictional transmission comprising:
   a first running surface;
   a second running surface;
   a cage; and
   at least one rolling contact element guided in frictional engagement between the first and second running surfaces and further guided by the cage,
   wherein the first running surface is supported in a fixed position and the second running surface and the cage are configured to rotate such that an input torque is introduced via one of the cage and the second running surface and an output torque is output via the other of the cage and the second running surface.

2. The frictional transmission according to claim 1, further comprising:
   a preloading device configured to apply an axial force to the first and second running surfaces and the at least one rolling contact element guided in frictional engagement therebetween.

3. The frictional transmission according to claim 1, wherein the transmission is configured such that a sliding friction between the at least one rolling contact element and the first and second running surfaces is greater than a sliding friction between the at least one rolling contact element and the cage.

4. The frictional transmission according to claim 1, wherein the at least one rolling contact element includes a plurality of rolling contact elements arranged adjacent to one another in a radial direction.

5. The frictional transmission according to claim 1, wherein the at least one rolling contact element includes a ball.

6. The frictional transmission according to claim 1, further comprising:
   an input defined in a central portion of the cage and the second running surface; and
   an output defined in the central portion of the cage and the second running surface.

7. The frictional transmission according to claim 1, further comprising:
   an additional axial bearing.

8. The frictional transmission according to claim 1, further comprising:
   an additional radial bearing.

9. The frictional transmission according to claim 1, wherein:
the first running surface includes a first axially recessed raceway, and
the second running surface includes a second axially recessed raceway.

10. A vehicle brake system comprising:
a hydraulic unit having a frictional transmission including (i) a first running surface, (ii) a second running surface, (iii) a cage, and (iv) at least one rolling contact element guided in frictional engagement between the first and second running surfaces and further guided by the cage,
wherein the first running surface is supported in a fixed position and the second running surface and the cage are configured to rotate such that an input torque is introduced via one of the cage and the second running surface and an output torque is output via the other of the cage and the second running surface.

11. A frictional transmission comprising:
a housing disk including a first running surface;
a second running surface;
a cage; and
at least one rolling contact element guided in frictional engagement between the first and second running surfaces and further guided by the cage,
wherein the first running surface is fixed relative to the housing disk, and the second running surface and the cage are configured to rotate such that an input torque is introduced via one of the cage and the second running surface and an output torque is output via the other of the cage and the second running surface.

12. The frictional transmission according to claim 11, further comprising:
a preloading device configured to apply an axial force to the first and second running surfaces and the at least one rolling contact element guided in frictional engagement therebetween.

13. The frictional transmission according to claim 11, wherein the transmission is configured such that a sliding friction between the at least one rolling contact element and the first and second running surfaces is greater than a sliding friction between the at least one rolling contact element and the cage.

14. The frictional transmission according to claim 11, wherein the at least one rolling contact element includes a plurality of rolling contact elements arranged adjacent to one another in a radial direction.

15. The frictional transmission according to claim 11, wherein the at least one rolling contact element includes a ball.

16. The frictional transmission according to claim 11, further comprising:
an input defined in a central portion of the cage and the second running surface; and
an output defined in the central portion of the cage and the second running surface.

17. The frictional transmission according to claim 11, further comprising:
an additional axial bearing.

18. The frictional transmission according to claim 11, further comprising:
an additional radial bearing.

19. The frictional transmission according to claim 11, wherein:
the first running surface includes a first axially recessed raceway, and
the second running surface includes a second axially recessed raceway.

* * * * *